July 2, 1935.   T. J. SMULSKI   2,006,658
ELECTRIC CONTROL SYSTEM
Filed Oct. 4, 1930   2 Sheets-Sheet 1

INVENTOR.
Theodore J. Smulski
BY Slough and Canfield
ATTORNEY.

July 2, 1935.  T. J. SMULSKI  2,006,658
ELECTRIC CONTROL SYSTEM
Filed Oct. 4, 1930   2 Sheets-Sheet 2
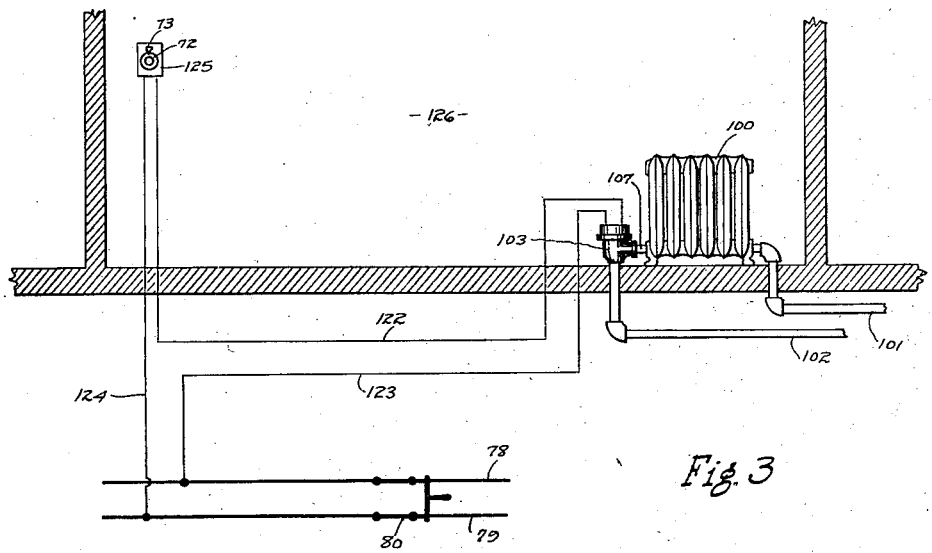
Fig. 3
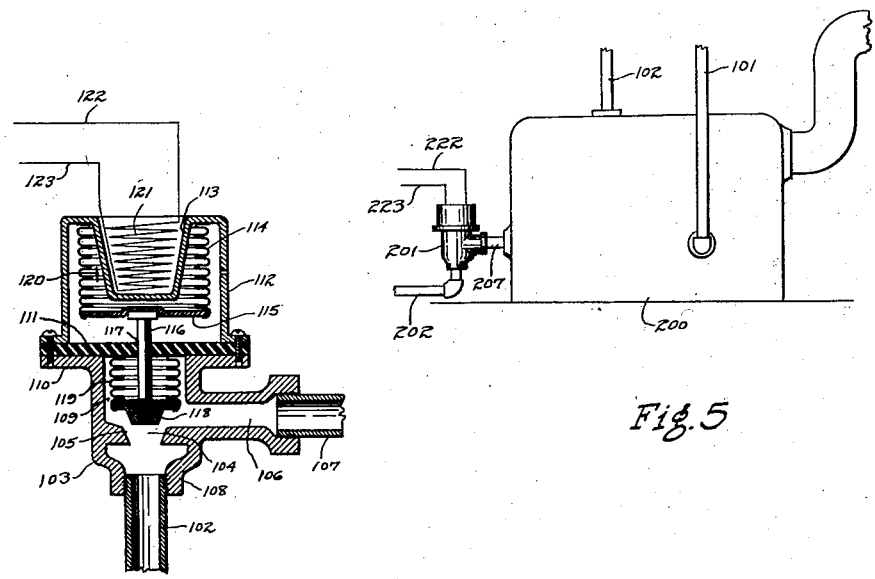
Fig. 4
Fig. 5
INVENTOR.
Theodore J. Smulski
BY
Slough and Canfield
ATTORNEYS Patented July 2, 1935

2,006,658

UNITED STATES PATENT OFFICE 2,006,658

ELECTRIC CONTROL SYSTEM

Theodore J. Smulski, Gary, Ind., assignor to The Anderson Company, Gary, Ind., a corporation of Indiana Application October 4, 1930, Serial No. 486,419

3 Claims. (Cl. 236—68)

This invention relates to automatic electric control systems, and particularly to systems for automatically controlling the functions, operation etc. of remotely situated apparatus, machinery or the like.

My invention is applicable to numerous uses and to the control of various remotely situated types of apparatus in which it may be desired to cause an element of the apparatus having a range of movement to take up any of the possible positions within its range.

In this application, however, I have chosen to illustrate and describe my invention as applied to controlling the heating apparatus for heating the interior of a building to maintain the temperature thereof substantially constant.

Heretofore, the heating plants of buildings have been automatically controlled by systems responsive to changes of temperature at its electric station in the building, to maintain the temperature within upper and lower predetermined limits. Upon attaining the predetermined maximum temperature, the heating apparatus has been operated to reduce the rate at which heat is supplied thereby causing a gradual lowering of room temperature and upon reaching the lower or minimum predetermined temperature, the apparatus has been correspondingly operated to increase the rate of heat supply, thus the temperature of the room heated by the apparatus must necessarily vary a number of degrees to effect the regulation of the apparatus.

It is one of the objects of this invention to provide a control system responsive to the temperature of the room or rooms being heated which will operate the heating apparatus in a manner to maintain a more nearly constant room temperature than has heretofore been attainable.

Another object is to provide such a control system which will operate to vary the rate at which heat is supplied to the room or rooms in response to exceedingly minute changes of room temperature to maintain the room temperature substantially constant.

Another object is to provide a system of control for heating apparatus operable to vary the rate at which heat is supplied thereby by controlling the position of a movable element of the apparatus, such, for example, as a draft regulating element of a furnace or a steam or water flow valve in a pipe line to a radiator and in which the said draft regulating element or valve is controlled to take up successively any or all of the possible positions within its complete range of movement.

Another object is to provide a control system for heating apparatus of the class referred to in which a draft regulating element, or valve, or the like may be moved to vary the rate at which heat is supplied to the room or rooms by minute increments or decrements over a part or all of its range of movement.

Another object is to provide an automatic control system whereby a remotely situated movable element of an apparatus may be caused to take up any of the possible positions within its range of movement in response to changes of temperature at a proximate station.

Another object is to provide an automatic electric control system comprising a control element adapted to transmit therefrom over a suitable circuit, electric energy at a rate responsive to and in accordance with changes of a variable factor, such, for example, as temperature; and a power supplying element adapted to be actuated by the said energy transmitted thereto; and a remotely situated element of an apparatus adapted to be moved by the power supplying element to take up any or all of the possible positions within its range of movement in response to and in accordance with the rates of energy transmitted to the power supplying element.

Another object is to provide an automatic electric control system of the kind referred to in the preceding paragraph and in which the movable element of the apparatus is adapted to effect variations of the variable factor.

Another object is to provide an automatic electric control system for heating apparatus and which is adapted to control the heat supplied by the apparatus in various ways, and which may be employed to control the supply of heat in either of said ways singly or in a plurality of said ways in combination.

Other objects will be apparent to those skilled in the art to which my invention appertains.

My invention is fully disclosed in the following description taken in connection with the accompanying drawings, in which:

Fig. 3 is a diagrammatic illustration of another embodiment of my invention;

Fig. 4 is a fragmentary view in cross-section to a larger scale of a part of the apparatus diagrammatically illustrated in Fig. 3;

Fig. 5 is a view similar to Fig. 3 showing another modification.

Figure 1:
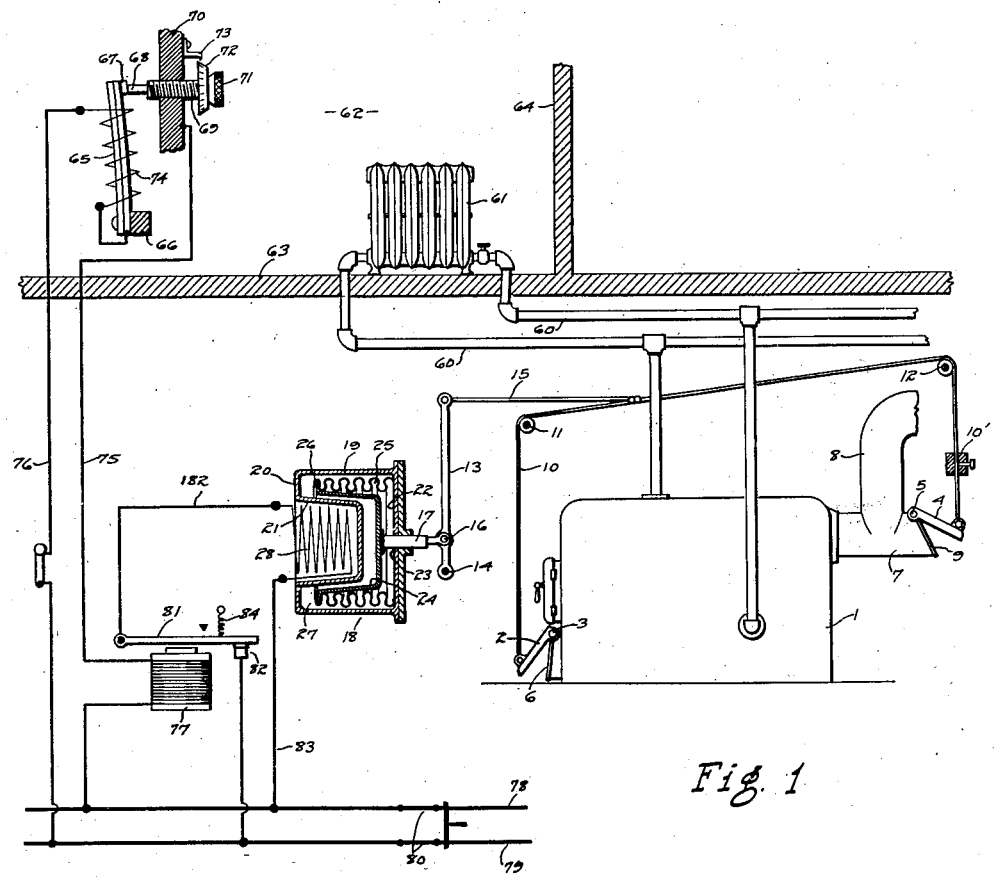
Fig. 1 is a diagrammatic illustration of an embodiment of my invention.

Referring to the drawings, I have shown at 1, in simplified form, a furnace of the type commonly employed for heating interiors of buildings and comprising a draft regulating door 2 pivoted to the furnace frame at 3 and a check draft door 4 pivoted at 5. Air for combustion purposes may enter through a doorway 6 and the products of combustion may pass out through a horizontal duct 7 and smoke pipe 8. The duct 7 has a doorway 9 beyond the pipe 8. A chain or cord 10 is connected at one end to the door 2 and passes over pulleys 11 and 12 and is connected at the other end to the door 4, and may be provided with a counterbalancing weight 10'.

The construction thus far described is well known. Opening of the door 2 increases the draft and the combustion. Opening the door 4 by-passes the draft and reduces the combustion. By connecting the doors 2 and 4 by the chain 10, upon opening the door 2, the door 4 is correspondingly closed and vice versa. The parts just described constitute no essential part of my invention and are merely illustrative of one method of controlling the combustion of the furnace, and any movable element or elements other than the doors 2 and 4 which may function to change the rate of combustion in the furnace may be employed.

The furnaces indicated as of the steam or hot water type and by means of pipes 60—60 supplies heat to a radiator or like device 61 in a room to be heated, indicated generally at 62, the floor 63 and one wall 64 thereof only being shown.

The following means is provided to move the combustion regulating element, such as the doors 2 and 4. A lever 13 fulcrumed on a stationary pivot 14 at one end has its other end connected by a chain 15 to the chain 10 at a point between the pulleys 11 and 12. Between its ends, the lever 13 is pivotally connected as at 16 to a connecting rod 17 associated with a thermostatic device indicated generally at 18. The thermostatic device 18 has an outer generally cylindrical casing 19, the end wall 20 at one axial end thereof having an inwardly directed cup-shaped recess 21. The other end wall 22 of the casing 19 is axially perforated as at 23, through which perforation a connecting rod 17 extends. On the inner end of the connecting rod is a generally cup-shaped element 24 adapted to nest with the wall of the recess 21 when moved axially.

Surrounding the cup-shaped element 24, coaxial therewith is a generally cylindrical bellows 25 having annular corrugations in the wall thereof of well known form and construction. One axial end of the bellows 25 is sealed as at 26 to the open end of the element 24, and the other axial end of the bellows is sealed to the inner surface of the end wall 22. A sealed chamber 27 is thus formed, the chamber being defined by the cylindrical wall 19, end wall 20, the wall of the cup-shaped recess 21, the wall of the cup-shaped element 24 and the corrugated bellows 25. A suitable quantity of thermally expansible fluid is provided in the chamber 27, sealed therein. An electric heating winding or other electric heating element 28 is disposed within the recess 21, and upon the flow of electric current therethrough, the heat generated therein is transmitted through the wall of the recess 21 to the fluid within the chamber 27, heating and expanding the same, and the pressure thus created collapses the bellows wall 25 and forceably moves the cup-shaped element 24 and the connecting rod 17 toward the right, as viewed in Fig. 1, moving the lever 13 clockwise around its fulcrum 14. Upon a cessation or diminution of heat in the element 28, the fluid in the chamber 27 condenses and contracts, and the bellows is expanded axially by atmospheric pressure, correspondingly moving the lever 13 counter-clockwise. The space within the bellows 25 is open to atmospheric pressure through the perforation 23. Upon movement of the lever 13 in alternate directions, the doorway 6 will be opened wider and the doorway 9 will be more nearly closed and vice versa.

The means for supplying heat to the heating element 28 will now be described. In the room indicated at 62, a bi-metallic thermo-responsive element 65 is fixed at one end as at 66 and on its other end carries the contact 67, movable in response to the bending movement of the element 65. A stationary contact 68 on the end of the screw 69, threaded into a stationary support 70 may be engaged by the contact 67. Screw 69 may be adjustably rotated to adjust the position of the contact 68 by means of a knob 71 and a dial 72 on the screw. The dial 72 may be graduated in degrees to indicate desired room temperature and the stationary pointer 73 may indicate temperature adjustments of the dial. Associated with the bi-metallic element 65 is an electric heating coil or other electric heating means 74.

Current to energize the heating element 74 may flow from a supply main 79 through a main switch 80 and by a wire 76 through the heating element 74 and thence by way of the bi-metallic element 65, contacts 67 and 68 and screw 69 to a wire 75, and thence back to the other main 78, the winding 77 of an electro-magnetic relay being interposed in the line 75.

The armature 81 of the relay controls a set of contacts 82. When the contacts 82 are closed, current may flow from the main 79 through the contacts 82, armature 81, and a wire 82 to and through the heating element 28 and thence by wire 83 back to the main 78. The armature 81 has a spring 84 for retracting it to open contact position.

In operation, upon closure of the main switch 80, current may flow in the circuit above described to heat the element 74. The same current energizes the winding 77 and closes the contact 82, causing current to flow through the heating element 28. The current thus flowing heats the bi-metallic element 65 causing it to bend sufficiently to break the contact 67—68 and to interrupt the current flow. The element 65 then cools down and again closes the contact 67—68, and again effecting closure of the contact 82. Thus the repeated closing and opening of the contact 67—68 sends a series of current impulses to the winding 77, causing the contact 82 to be successively closed and opened correspondingly sending a series of current impulses to the heating winding 28.

The construction of the heating element 28 and its associated parts of the thermostatic device 18, is by well known means, made to provide a predetermined amount of heat storage capacity or thermal inertia so that the element 28 is brought up to a substantially constant temperature by the current impulses. Accordingly for a series of impulses of substantially uniform duration and interval between impulses, the thermostatic device 18 will move the lever 13 to a definite substantially stationary position.

The bi-metallic element 65 and its heating winding 74 are designed with relatively low thermal inertia so that the contact 67 will be moved toward and from the contact 68 upon slight changes of temperature of the element 65.

Furthermore, the element 65 will be thermally responsive to temperature derived from the room 62 in which it is situated, as well as from the heating element 74 thereon.

Upon a change of temperature in the room 62, however slight it may be, the temperature of the element 65 will be correspondingly changed thereby. If the room temperature falls, the temperature of the element 65 will accordingly fall, and current in the heating element 74 must flow for a longer period before the element 65 will be heated to the temperature at which it will break the contact 67—68. As a result, the current impulses will be of longer duration and the amount of the heat supplied to the heating element 28 will be greater, and the lever 13 will, due to the greater degree of expansion of the fluid in the chamber 27 of the thermostatic device 18, take up a new position farther in the clockwise direction as viewed in the drawings. The converse action will result if the temperature in the room 62 rises.

Furthermore, as will now be clear, by adjusting the position of the contact 68 by means of the knob 71 and dial 72, the duration of the impulses sent out by the contact 67—68 may be adjustably varied, because if the contact 68 be adjusted closer to the contact 67 by turning the dial 72 to indicate a lower temperature, the element 65 must be heated to a higher temperature before it can break the contact 67—68, which results in longer current impulses sent to the heating element 28.

From the foregoing description it will now appear that minute changes of temperature in the room 62 will effect a change in the duration of the impulses of current caused by the continuous making and breaking of the contact 67—68, and effect a corresponding change in the amount of heating of the heating element 28 and a change in the position of the lever 13. This in turn results in a change of position of the doors 2 and 4 of the furnace, as above described, and they may occupy positions anywhere in the range from fully closed to fully open.

It will also be clear that the movement of the doors 2 and 4 of the furnace will be in the direction to cause a substantially constant temperature in the room 62 to be maintained.

Figure 2:
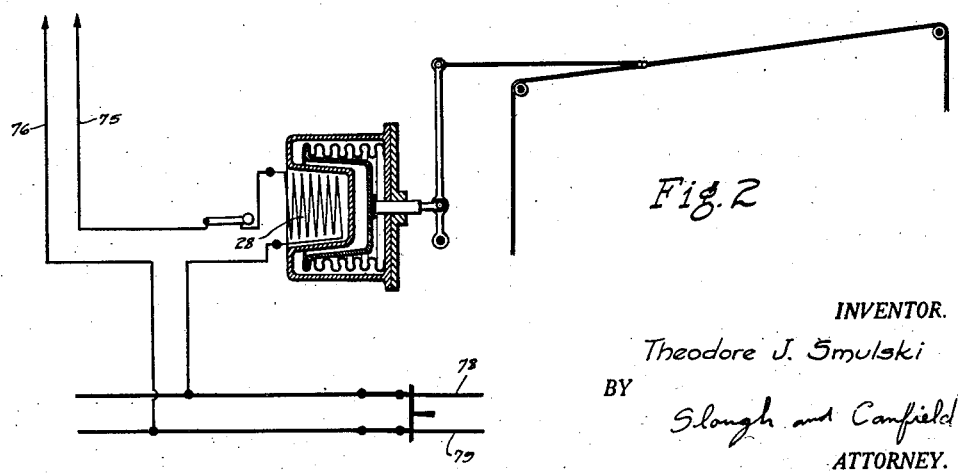
Fig. 2 is a view similar to Fig. 1 but showing a modification.

In the modification of my invention shown in Fig. 2, the relay contacts 82 are dispensed with and the heating element 28 is connected in series across the mains 78 and 79 with the heating element 74. The arrangement of Fig. 2 would be preferable in cases in which the amount of current necessary to heat the element 28 is small enough to be conveniently and practicably broken on the contact 67—68.

In the modification of my invention shown in Fig. 3, the control of the room temperature is effected by controlling the rate of flow of heating fluid through a radiator or other heating device 100. Heating fluid is supplied to the radiator 100 through pipes 101 and 102, the rate of flow being controlled by a valve 103 constructed, controlled and operating in the following manner.

The valve 103 shown separately to a larger scale and in cross-section in Fig. 4 comprises a valve chamber 104 provided with a valve seat 105, a laterally extending passageway 106 communicating with a radiator supply pipe 107 and a downwardly disposed extension 108 communicating with the supply pipe 102. Above the valve seat 105 is provided a chamber 109 at the upper termination of which is a transversely disposed connecting flange 110.

Upon the flange 110 is mounted a heat insulator 111 preferably in the form of a thick disk of suitable heat insulating material and surmounting the insulator 111 is a thermostatic device generally the same in construction as that described above in detail in connection with Fig. 1. The thermostatic device comprises a generally cylindrical casing 112, the upper axial end of which, as viewed in Fig. 4, is projected downwardly to form a recess wall 113. A corrugated bellows 114 within the wall 112 and preferably coaxial therewith is sealed at its upper end to the inner surface of the upper end wall of the casing 112, and at its lower end is sealed to a movable head 115. A valve stem 116 is secured to the head 115, extends downwardly through a perforation 117 in the insulator 111 and on its lower end carries a valve 118 adapted to seat and seal on the seat 105. To seal the aperture 117, a small bellows 119 of the corrugated cylindrical type is axially disposed around the valve stem 116 and sealed at its upper end to the insulator 111 and at its lower end to the valve 118.

In the chamber 120, defined by the bellows 114, the head 115 and the recessed wall 113, is placed a suitable amount of thermally expansible fluid. Within the recess formed by the recessed wall 113 is disposed a heating winding or other electrical heating element 121 adapted to be energized by current in wires 122 and 123 connected thereto. As shown in Fig. 3, the wire 123 goes directly to the supply main 78. The wire 122 connects with a device 125 and the latter is connected by wire 124 to the main 79.

The device 125 situated in the room 126 of Fig. 3 is or may be identically the same as the thermostatic device in the room 62 of Fig. 1 and has therefore been indicated in simplified form, the dial 72 and pointer 73 alone being identified by reference characters.

In operation, the thermostatic device 125 causes impulses of current to flow to the heating element 121 in the valve 103, and due to the relatively great thermal inertia of the parts of the valve described above and disposed above the insulating element 111, the winding 121 assumes a substantially constant temperature. Accordingly, the fluid in the chamber 120 expands and moves the valve 118 toward closed position to a definite substantially stationary position. A definite amount of heating fluid is thus permitted to flow from the supply pipe 102 through the valve seat 105 and to the radiator 100 by way of the pipe 107.

Upon an increase or decrease of temperature in the room 126, the current impulses sent to the valve by the device 125 will be correspondingly of longer or shorter duration, effecting a smaller or larger opening at the valve seat 105 and correspondingly decreasing or increasing the flow of heating fluid to the radiator 100. Thus the temperature of the room 126 is maintained substantially constant, only minute variations thereof being necessary to effect regulation of the valve 103.

In Fig. 5 I have shown another modification of my invention in which control of the heat supplied to the room such, for example, as the room 62 of Fig. 1 is effected in still another manner. In this form of my invention, the furnace indicated at 200 is of the oil or gas burning type, and the rate at which heat is supplied by the furnace 200 is controlled by controlling the rate of fuel supply to the furnace. At 201 is indicated generally a valve construction which may be identical to or similar to that illustrated in Fig. 4. This valve controls the supply of gas, oil or other fluid fuel to the furnace 200 in a manner similar to that by which the valve of Figs. 4 and 3 controls the flow of heating fluid to the radiator 100. The conduit 202 leads to a fuel supply source, the pipe or conduit 207 leads into the furnace 200 through the fuel burner. Impulses of current flowing to the valve construction 201 over wires 222 and 223 in response to the action of a thermo-responsive device such as that shown at 125 in Fig. 3, controls the valve to effect a control of the rate of fuel supply to effect a substantially constant temperature in the room 62.

In the foregoing description I have described three embodiments of my invention whereby room heating apparatus may be controlled to maintain room temperature substantially constant. In all of these cases it will be observed that the regulation is effected by a power device, thermo-responsive, and actuating a movable element (the lever 13 of Fig. 1 and the valve 118 of Figs. 3 and 4 and a similar or equivalent valve of Fig. 5), causing the movable element to take up definite positions wherever necessary in its total range of movement; and that the power device is actuated by a quantity of heat generated by a succession of current impulses, the quantity of heat being varied to effect the regulation by a corresponding variation in the duration of the current impulses.

Obviously, therefore, my invention is not limited to the exact arrangement shown and described hereinbefore. Other apparatus for controlling the temperature of a room in which the heat supplied to the room may be varied by moving a movable element falls within the scope of my invention.

Besides, the application of my invention to the control of fuel supply of the fluid type, as illustrated in Fig. 5, my invention is equally applicable to the control of fuel supply of furnaces in which solid fuel such as coal is supplied by a stoker mechanism, and in which the rate of stoking is controlled by the position of a movable controlling element.

Furthermore, the various forms of my invention shown and described above and others not shown and described may be employed in various combinations in a single heating system. For example, the system illustrated in Fig. 1 may be combined with that illustrated in Fig. 3.

Furthermore, my invention is not limited to controlling the temperature of rooms or buildings. It is equally applicable, as will appear to those skilled in this art, to the control of the temperature of fluids or solids in manufacturing processes where it is desired to maintain a substantially constant temperature by varying the rate at which heat is supplied.

Furthermore, my invention is not limited in its application to controlling and regulating temperature. It is, on the other hand, applicable to any type of apparatus in which it is desirable to move any movable element and cause it to take up definite positions within a range of movement in response to variations of any factor, such as pressure, velocity, rate of flow, etc., occurring at a point or station remote from the apparatus.

In such applications, a thermo-responsive device such as that indicated generally at 125 in Fig. 3 would vary the duration of the current impulses set out therefrom by a variation of the position of the contact 68 thereof effected by variations of the said pressure, velocity, rate of flow or the like.

My invention is also applicable to any apparatus in which it is desirable to move any movable element and cause it to take up definite positions within a range of movement and at a point or station remotely situated in response to manual movement at a proximate station. Such an application of my invention may be derived from the system illustrated in Fig. 1 in which the door 2 may be any movable element of any apparatus, which may be caused to take up any of the possible positions thereof in its total range of movement by corresponding manual movements of the dial 12.

Again, my invention is applicable to indicating and measuring apparatus in which an indication is made by the position of a movable element, particularly in instances where considerable power is required to move the indicating element, and in instances where it is desired to effect the indication at a point remote from the point or station at which the variations of the factor to be indicated occur.

Many other changes in and modifications of the embodiments of my invention hereinbefore illustrated and described and referred to may be made within the scope of my invention without sacrificing its advantages.

I claim:

1. In an electric control system and apparatus, an element variably movable in a range of movement to control a variable factor, a power device for operating the movable element, means for variably actuating the power device in response to changes of the variable factor, said means comprising a thermostatic element, a heating winding for the thermostatic element, the thermostatic element being movingly associated therewith and variably movable responsive to the joint influence of variations of temperature of the heating winding and changes of the variable factor, a circuit for the heating winding including a pair of make-and-break contacts, one of said contacts being movingly associated with the thermostatic element, means for transmitting energy to the power device in correspondence with fluctuations of the heating winding current, the power device being continuously operable to effect the movement of the movable element both during operable and inoperable periods of the energy transmitting means and relatively insensitive to small heating current fluctuations.

2. In an electric control system and apparatus, an element variably movable in a range of movement to control a variable factor, a power device for operating the movable element, means for variably actuating the power device in response to changes of the variable factor, said means comprising a thermostatic element, a heating winding for the thermostatic element, the thermostatic element being variably movable responsive to variations of temperature of the heating winding, a circuit for the heating winding including a pair of make-and-break contacts, one of said contacts being movingly associated with the thermostatic element, means for transmitting heating current impulses to the power devices in correspondence with fluctuations of the heating winding current, and the power device comprising a heating element of large heat capacity relative to the thermostatic element heating winding whereby the power device is relatively insensitive to the aforesaid current impulses and is adapted to continuously and modulatingly operate the movable element.

3. In an electric control system and apparatus for supplying heat at a point of use, a heat generating apparatus including an element variably movable to vary the heat supply, a continuously movable power device for modulatingly operating the movable element, means for variably actuating the power device in response to temperature changes at the point of use, said means comprising a thermostatic element, a heating winding for the thermostatic element, the thermostatic element being variably movable responsive to the joint influence of variations of temperature of the heating winding and temperature changes at the point of use, a circuit for the heating winding including a pair of make-and-break contacts, one of said contacts being movingly associated with the thermostatic element, the power device comprising a heating coil of large heat capacity and relatively insensitive to individual current impulses, and means for transmitting said current impulses to the heating coil in correspondence with fluctuations of the heating winding current.

THEODORE J. SMULSKI.